US012612052B2

(12) United States Patent
Palmer et al.

(10) Patent No.: US 12,612,052 B2
(45) Date of Patent: Apr. 28, 2026

(54) METHODS AND SYSTEMS FOR DRIVER IN THE LOOP CURVE VELOCITY CONTROL

(71) Applicant: GM GLOBAL TECHNOLOGY OPERATIONS LLC, Detroit, MI (US)

(72) Inventors: Matthew Jared Palmer, Fenton, MI (US); Paul A. Adam, Milford, MI (US); Tetyana V Mamchuk, Walled Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 133 days.

(21) Appl. No.: 18/365,860

(22) Filed: Aug. 4, 2023

(65) Prior Publication Data
US 2025/0042415 A1 Feb. 6, 2025

(51) Int. Cl.
*B60W 40/109* (2012.01)
*B60W 60/00* (2020.01)

(52) U.S. Cl.
CPC ........ *B60W 40/109* (2013.01); *B60W 60/001* (2020.02); *B60W 2420/403* (2013.01); *B60W 2552/53* (2020.02)

(58) Field of Classification Search
CPC .............. B60W 30/02; B60W 30/045; B60W 30/18145; B60W 40/072; B60W 40/109; B60W 2050/0002; B60W 50/0097; B60W 60/001; B60W 2420/40; B60W 2420/403; B60W 2420/408; B60W 2520/125; B60W 2552/20; B60W 2552/30; B60W 2552/53; B60W 2556/10; B60W 2556/20; B60W 2720/10; G05D 1/0212; G05D 1/0231
See application file for complete search history.

(56) References Cited

U.S. PATENT DOCUMENTS

| | | | |
|---|---|---|---|
| 2012/0016646 A1* | 1/2012 | Takenaka ................ | B60T 8/172 |
| | | | 703/2 |
| 2012/0053853 A1* | 3/2012 | Tan ..................... | B60W 40/105 |
| | | | 702/148 |
| 2017/0028995 A1* | 2/2017 | Mori ................. | B60W 60/0053 |
| 2017/0072996 A1* | 3/2017 | Hong .................... | B62D 5/049 |
| 2020/0377082 A1* | 12/2020 | Nassouri .......... | B60W 30/0956 |
| 2024/0336260 A1* | 10/2024 | Shimura .............. | G06V 20/588 |

FOREIGN PATENT DOCUMENTS

| | | |
|---|---|---|
| DE | 102007036417 A1 | 2/2009 |
| DE | 102018125207 A1 | 4/2019 |

* cited by examiner

*Primary Examiner* — Brandon Z Willis
(74) *Attorney, Agent, or Firm* — Lorenz & Kopf LLP

(57) ABSTRACT

Methods and systems for providing driving assistance in a vehicle. In one embodiment, a method includes: determining, by a processor, a trajectory of the vehicle along a roadway; determining, by the processor, a confidence score based on a predicted lateral acceleration and an actual lateral acceleration at a point along the trajectory; determining, by the processor, longitudinal velocity data based on the confidence score; and generating, by the processor, control signals to vehicle actuators to control the vehicle based on the longitudinal velocity data.

16 Claims, 5 Drawing Sheets

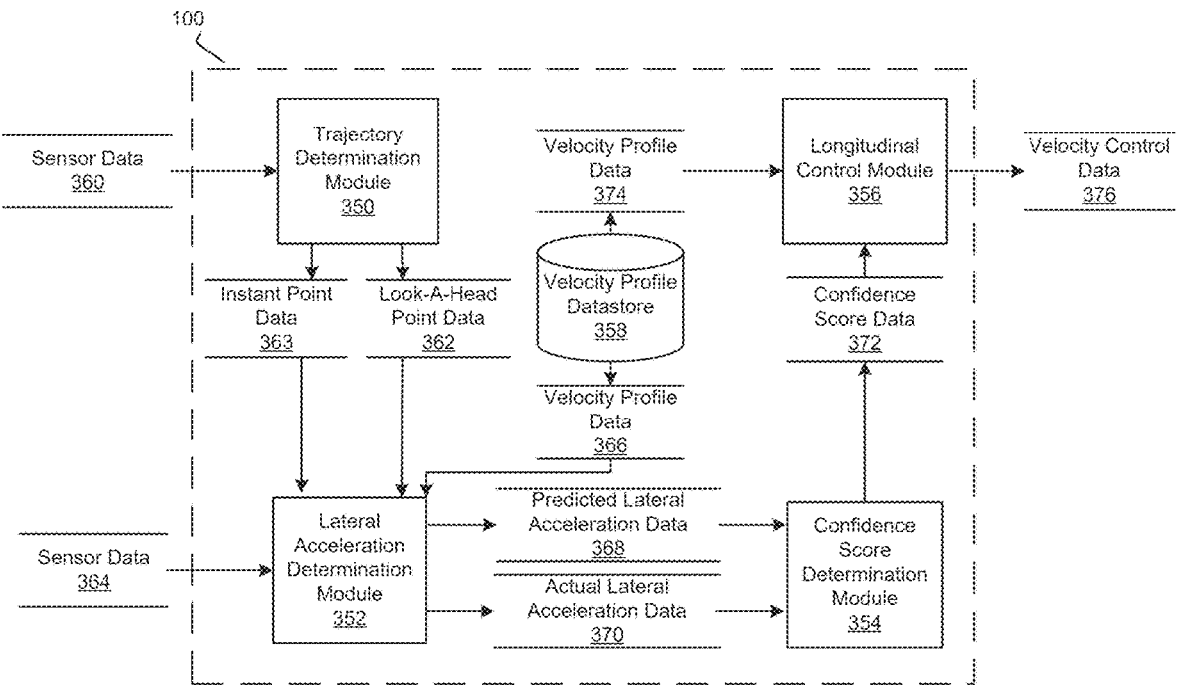

100

Sensor Data
360

Trajectory
Determination
Module
350

Instant Point
Data
363

Look-A-Head
Point Data
362

Velocity Profile
Data
374

Velocity Profile
Datastore
358

Velocity Profile
Data
366

Longitudinal
Control Module
356

Confidence
Score Data
372

Velocity Control
Data
376

Sensor Data
364

Lateral
Acceleration
Determination
Module
352

Predicted Lateral
Acceleration Data
368

Actual Lateral
Acceleration Data
370

Confidence
Score
Determination
Module
354

FIG. 3

METHODS AND SYSTEMS FOR DRIVER IN THE LOOP CURVE VELOCITY CONTROL

INTRODUCTION

The technical field generally relates to systems, methods, and apparatuses for providing longitudinal velocity control by an autonomous or semi-autonomous driving system.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Some autonomous driving features allow for adaptive cruise control, lane following, lane centering, etc. where speed and/or steering are controlled to follow an intended path or an intended lane. In some instances, such as on curvy roads, a driving feature may be disabled due to the lack of sensing ability of the roadway ahead.

Accordingly, it is desirable to provide improved velocity control strategies, methods, and systems for improved autonomous or semi-autonomous control of the vehicle. Furthermore, other desirable features and characteristics of the present disclosure will become apparent from the subsequent detailed description and the appended claims, taken in conjunction with the accompanying drawings and the foregoing technical field and background.

SUMMARY

Disclosed herein are vehicles with, methods for, and systems for providing driving assistance. In one embodiment, determining, by a processor, a trajectory of the vehicle along a roadway; determining, by the processor, a confidence score based on a predicted lateral acceleration and an actual lateral acceleration at a point along the trajectory; determining, by the processor, longitudinal velocity data based on the confidence score; and generating, by the processor, control signals to vehicle actuators to control the vehicle based on the longitudinal velocity data.

In various embodiments, the method includes receiving, by the processor, sensor data from a sensor system of the vehicle, wherein the sensor data includes camera data, and wherein the determining the trajectory is based on an identification from the camera data of lane markings on a roadway ahead of the vehicle.

In various embodiments, when the lane markings are not identified from the camera data, the determining the confidence score comprises decreasing the confidence score.

In various embodiments, the determining the confidence score is based on a difference between the predicted lateral acceleration and the actual lateral acceleration at the point along the trajectory, and when the difference is above a threshold, the confidence score is decreased, and when the difference is below the threshold, the confidence score is increased.

In various embodiments, the method includes determining the predicted lateral acceleration based on a radial point along the trajectory.

In various embodiments, the method includes determining the actual lateral acceleration based on steering data.

In various embodiments, the point is a point ahead of the vehicle along the trajectory.

In various embodiments, the point is an instant point of the vehicle path.

In various embodiments, the determining the longitudinal velocity data is based on a velocity profile defined by a current velocity, a set velocity, and a desired velocity.

In various embodiments, the determining the longitudinal velocity data is based on a comparison of the confidence score to a plurality of ranges and selecting a velocity profile determined from a plurality of velocity profiles based on the comparison.

In another embodiment, a system includes a controller including non-transitory computer readable media and configured to, by a processor: determine a trajectory of the vehicle along a roadway; determine a confidence score based on a predicted lateral acceleration and an actual lateral acceleration at a point along the trajectory; determine longitudinal velocity data based on the confidence score; and generate control signals to vehicle actuators to control the vehicle based on the longitudinal velocity data.

In various embodiments, the controller is further configured to receive sensor data from a sensor system of the vehicle, wherein the sensor data includes camera data, and wherein the controller determines the trajectory based on an identification from the camera data of lane markings on a roadway ahead of the vehicle.

In various embodiments, when the lane markings are not identified from the camera data, the controller is configured to determine the confidence score by decreasing the confidence score.

In various embodiments, the controller is configured to determine the confidence score based on a difference between the predicted lateral acceleration and the actual lateral acceleration at the point along the trajectory, wherein when the difference is above a threshold, the controller is configured to decrease the confidence score, and wherein when the difference is below the threshold, the controller is configured to increase the confidence score.

In various embodiments, the controller is further configured to determine the predicted lateral acceleration based on a radial point along the trajectory.

In various embodiments, the controller is further configured to determine the actual lateral acceleration based on steering data.

In various embodiments, the point is a point ahead of the vehicle along the trajectory.

In various embodiments, the point is an instant point of the vehicle path.

In various embodiments, the controller is configured to determine the longitudinal velocity data based on a plurality of velocity profiles, each defined by a current velocity, a set velocity, and a desired velocity, determine the longitudinal velocity data based on a comparison of the confidence score to a plurality of ranges, and select a velocity profile from the plurality of velocity profiles based on the comparison.

In another embodiment, a vehicle includes: a sensor system configured to sense an environment of the vehicle; an actuator system; and a controller for implementing a driver assistance system, the controller configured to: determine a trajectory of the vehicle along a roadway; determine a confidence score based on a predicted lateral acceleration and an actual lateral acceleration at a point along the trajectory; determine longitudinal velocity data based on the confidence score; and generate control signals to the actuator system to control the vehicle based on the longitudinal velocity data.

BRIEF DESCRIPTION OF THE DRAWINGS

The exemplary embodiments will hereinafter be described in conjunction with the following drawing figures, wherein like numerals denote like elements, and wherein:

FIG. 3 is a dataflow diagram illustrating features of the velocity control system of the vehicle, in accordance with various embodiments;

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
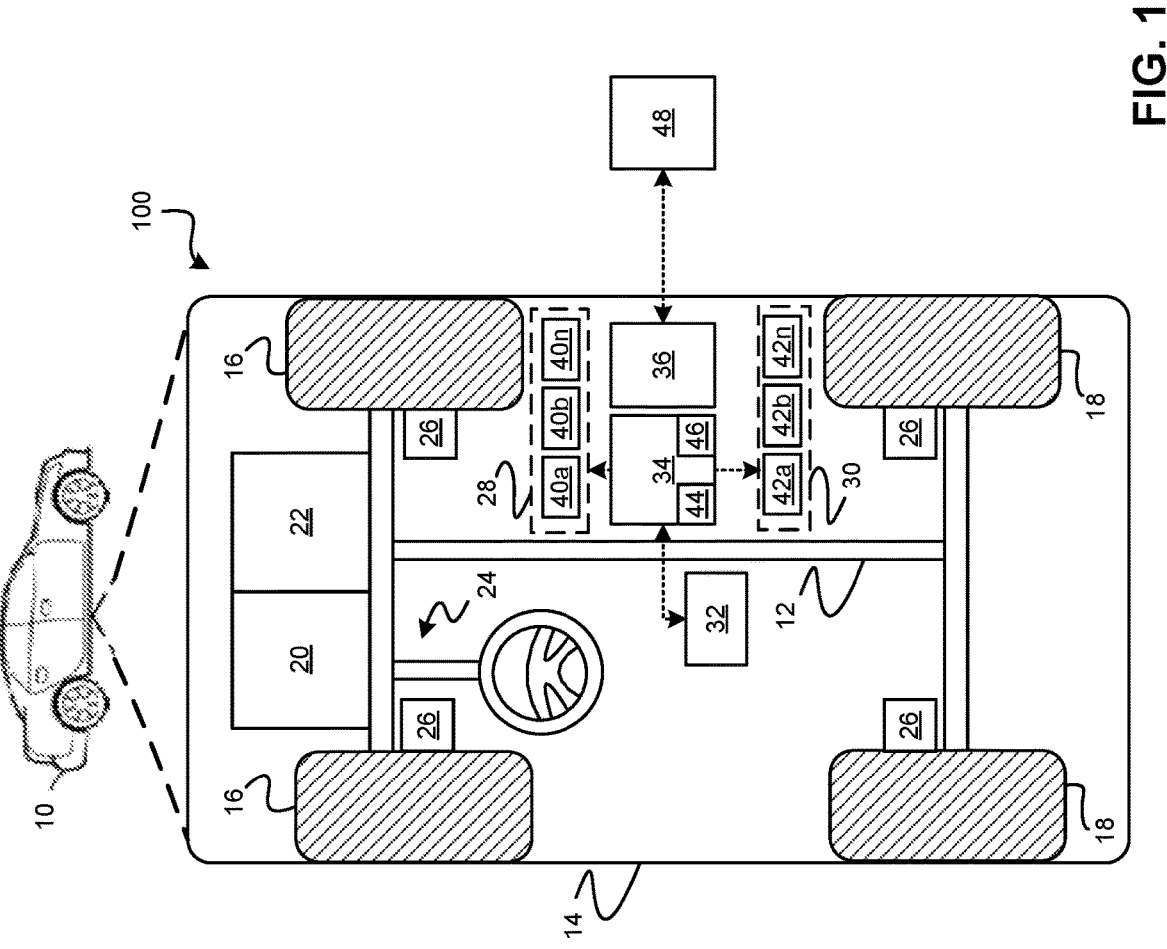
FIG. 1 is a block diagram illustrating an autonomous vehicle having a velocity control system, in accordance with various embodiments.

With reference to FIG. 1, a velocity control system shown generally at 100 is associated with a vehicle 10 in accordance with various embodiments. In general, the velocity control system 100 controls the longitudinal velocity of the vehicle using velocity profile shaping that is based on a determined confidence score. The velocity control system 100 determines the confidence score, for example, by comparing driver actions (i.e., current vehicle path, based on, for example, road wheel angle) relative to a formulated optimal trajectory. The velocity control system 100 uses the confidence score to perform velocity profile shaping in many situations, even when road markings disappear.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous or semi-autonomous vehicle and the velocity control system 100 is incorporated into the autonomous or semi-autonomous vehicle 10 (hereinafter referred to as the autonomous vehicle 10). The autonomous vehicle 10 is, for example, a vehicle that is automatically controlled in some way to carry passengers or goods from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is configured to perform autonomous features such as, but not limited to, hands on lane centering, adaptive cruise control, super cruise, ultra-cruise, etc.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
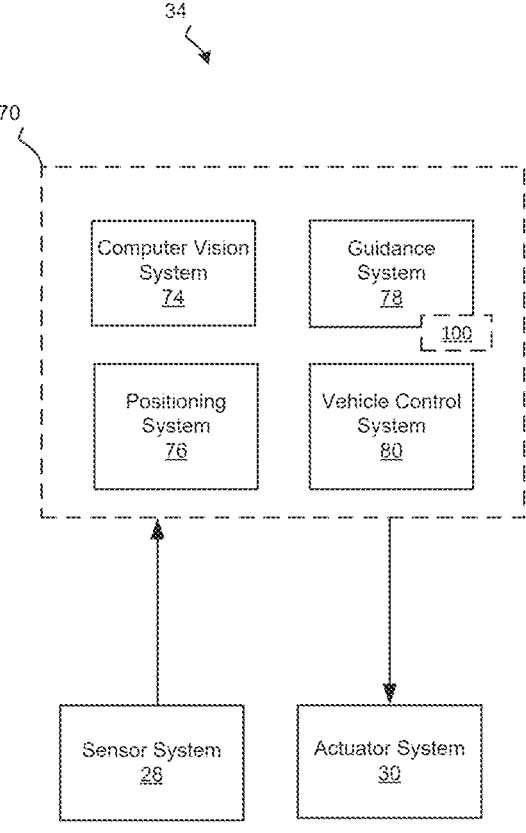
FIG. 2 is a functional block diagram illustrating components of an autonomous driving system having the velocity control system, in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system. For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, as discussed in detail below, one or more instructions of the controller 34 are embodied in the velocity control system 100 and, when executed by the processor 44, process sensor data and/or other data, predict an optimal trajectory, compare driver actions to the optimal trajectory, compute a confidence score based on the comparison, and shape a longitudinal response profile of the vehicle 10 based on the confidence score.

Referring now to FIG. 2, and with continued reference to FIG. 1, a dataflow diagram illustrates various embodiments of an autonomous driving system (ADS) 70 which may be embedded within the controller 34 and which may include parts of the velocity control system 100 in accordance with various embodiments. That is, suitable software and/or hardware components of controller 34 (e.g., processor 44 and computer-readable storage device 46) are utilized to provide an autonomous driving system 70 that is used in conjunction with vehicle 10.

Inputs to the autonomous driving system 70 may be received from the sensor system 28, received from other control modules (not shown) associated with the autonomous vehicle 10, received from the communication system 36, and/or determined/modeled by other sub-modules (not shown) within the controller 34. In various embodiments, the instructions of the autonomous driving system 70 may be organized by function or system. For example, as shown in FIG. 2, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to, cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path. In particular, the vehicle control system 80 generates control signals (e.g., steering control signals, acceleration control signals, braking control signals) for the actuator system 30 to direct the vehicle 10 to follow the desired trajectory determined by the guidance system 78.

As mentioned briefly above, the velocity control system 100 of FIG. 1 is included within the autonomous driving system 70. For example, all or parts of the velocity control system 100 may be included within one or more of the sub-systems or as a separate system (as shown). For example, as shown in more detail with regard to FIG. 3 and with continued reference to FIGS. 1 and 2, the velocity control system 100 includes a trajectory determination module 350, a lateral acceleration determination module 352, a confidence score determination module 354, a longitudinal control module 356, and a velocity profile datastore 358.

In various embodiments, the velocity profile datastore 358 stores velocity profiles that define an acceleration or deceleration pattern used for longitudinal control of the vehicle 10. In various embodiments, any number of velocity profiles can be defined. For example, they can be defined as a multi-dimensional lookup table that is based on a current velocity, a set velocity, and a desired velocity, or a velocity error. In various embodiments, the velocity profiles provide as output a torque value to drive the wheels at the desired speed. The torque values may be defined according to the propulsion system, the transmission system, and/or brake system 26 configuration of the vehicle 10 and according to the resulting rates of deceleration/accelerations. For exemplary purposes, the disclosure will be discussed based on at least three exemplary velocity profiles with three different rates, a first profile referred to as an optimum acceleration/deceleration profile, a second profile referred to as a partially limited acceleration/deceleration profile, and a third profile referred to as a limited acceleration/deceleration profile.

In various embodiments, the trajectory determination module 350 receives as input sensor data 360. The trajectory determination module 350 processes the sensor data 360 to determine an upcoming trajectory of the vehicle 10. In various embodiments, the trajectory determination module 350 determines the trajectory based on the type and location of lane markings identified ahead of the vehicle 10. For example, the sensor data 360 can include camera data from the camera sensor. As can be appreciated, other sensor data may be used to determine the lane markings in various embodiments.

Figure 4:
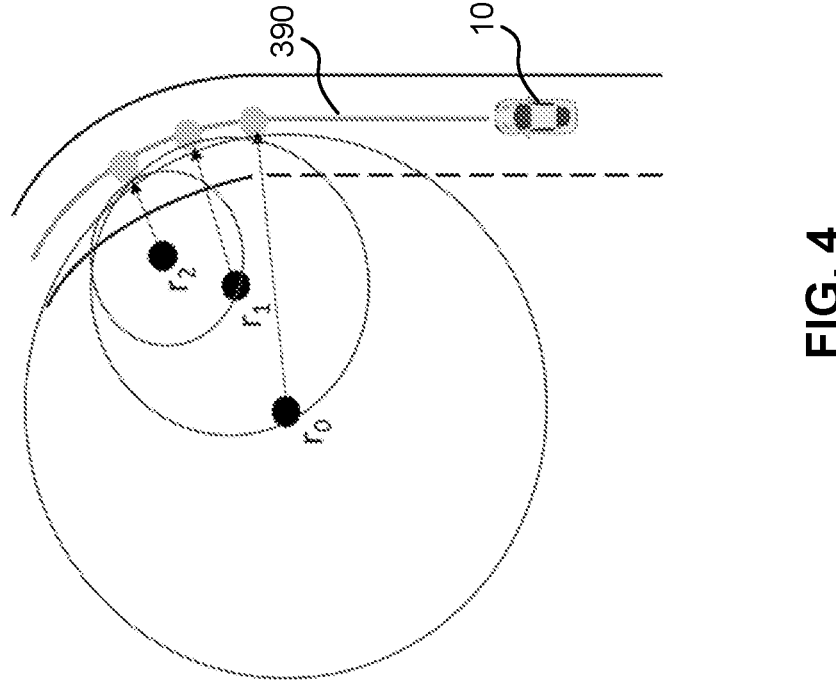
FIG. 4 is an illustration of a roadway and trajectory and data determined by the velocity control system, in accordance with various embodiments.

The trajectory determination module 350 processes the camera data using one or more machine learning techniques to extract a type and location of any left and/or right lane markings ahead of the vehicle 10. In various embodiments, the machine learning technique(s) provides a confidence score along with the type and location, and the trajectory determination module 350 determines the trajectory from the type and location of the lane markings as well as the confidence score. Thereafter, the trajectory determination module 350 identifies one or more radial points along the trajectory. For example, as shown in FIG. 4, the trajectory determination module 350 determines radial points (r0, r1, r2, etc.) along a predicted trajectory 390 (e.g., by sweeping the trajectory 390) based on the relationship:

$$r = \frac{|y(\ddot{x}_{la})|}{\left[1 + (y(\dot{x}_{la}))^2\right]^{3/2}},$$

where $y(x) = c_0 + c_1 x + c_2 x^2 + c_3 x^3$, and where la represents look ahead.

The trajectory determination module 350 generates look ahead point data 362 based on the determined points.

In some instances, the trajectory determination module 350 does not identify any lane markings, or the trajectory determination module 350 is not able to identify lane markings with a certain confidence, the trajectory determination module 350 determines it has been a short distance since the last lane markings have been identified (e.g., less than a threshold). In such instances, the trajectory determination module 350 determines an instant point along a current path of the vehicle 10 based on the last known lane marker or projected virtual lane markers and generates instant point data 363 based thereon.

In various embodiments, the lateral acceleration determination module 352 receives as input the look ahead point data 362 or the instant point data 363, and sensor data 364. The sensor data 364 can include steering data from sensor associated with the steering system. When the look ahead point data 362 is received, the lateral acceleration determination module 352 predicts a lateral acceleration at the look ahead point identified by the look ahead data 362.

For example, the lateral acceleration can be predicted based on the relationship:

$$a_y = \frac{V_x(t)^2}{r},$$

Where r represents the curvature at the point, and $V_x(t)$ represents the longitudinal velocity at time t.

In various embodiments, the velocity that can be computed based on the relationship:

$$V_x(t) = \int_0^{t_{la}} a_x(t)dt + C,$$

Where $a_x$ represents the longitudinal acceleration, and where C represents a compensation value determined from a currently applied velocity profile. For example, the lateral acceleration determination module 352 determines if any compensation of the lateral acceleration is needed based on the longitudinal velocity profile being executed. For example, if the current longitudinal velocity profile requires longitudinal deceleration due to another vehicle being detected in the lane, the predicted lateral acceleration is compensated to account for the expected deceleration of the vehicle 10. As can be appreciated, the compensation can be based on other scenarios and profiles as the disclosure is not limited to the present example.

In various embodiments, when the instant point data 363 is received, the lateral acceleration determination module 352 predicts a lateral acceleration at the instant point identified by the instant point data 363. As can be appreciated, the predicted lateral acceleration can be similarly determined and compensated based on the longitudinal velocity profile as discussed above.

In various embodiments, the lateral acceleration determination module 352 then determines, at the look ahead point or the instant point, the actual lateral acceleration that results from the driver steering the vehicle 10. For example, the sensor data 364 can include steering data from the sensors associated with the steering system 24 of the vehicle 10. The lateral acceleration determination module 352 evaluates the steering data and generates actual lateral acceleration data 370 based thereon.

In various embodiments, the confidence score determination module 354 receives as input the predicted lateral acceleration data 368, and the actual lateral acceleration data 370. The confidence score determination module 354 determines a confidence score and generates confidence score data 372 based thereon. For example, when the predicted lateral acceleration is based on the instant point, the confidence score determination module 354 decreases the confidence score.

In another example, when the predicated lateral acceleration is based on the trajectory, the confidence score determination module 354 then computes a difference between the predicted lateral acceleration data 368 and the actual lateral acceleration data 370 and evaluates the difference to compute a confidence score. For example, when the difference is greater than a threshold, the confidence score determination module 354 decreases the confidence score and the confidence score data 372 is generated based thereon. In another example, when the difference is less than or equal to the threshold, the confidence score determination module 354 increases the confidence score and generates the confidence score data 372 based thereon.

The longitudinal control module 356 receives as input the confidence score data 372. Based on the confidence score, the longitudinal control module 356 selects from the velocity profile datastore 358 a longitudinal velocity profile by which to control the longitudinal velocity of the vehicle 10. The longitudinal control module 356 then generates velocity control data 376 used to control the vehicle 10 based on the selected velocity profile.

For example, when the confidence score is within a first range, for example a high range, the longitudinal velocity profile shapes the velocity according to the acceleration/deceleration rate based on an optimum velocity profile. When the confidence score is within a second range, for example a medium range, the longitudinal velocity profile shapes the velocity according to a partially limited velocity profile. When the confidence score is within a third range, for example a low range, the longitudinal velocity profile shapes the velocity according to a limited velocity profile. As can be appreciated, any number of ranges can be implemented with any number of velocity profiles in various embodiments.

Figure 5:
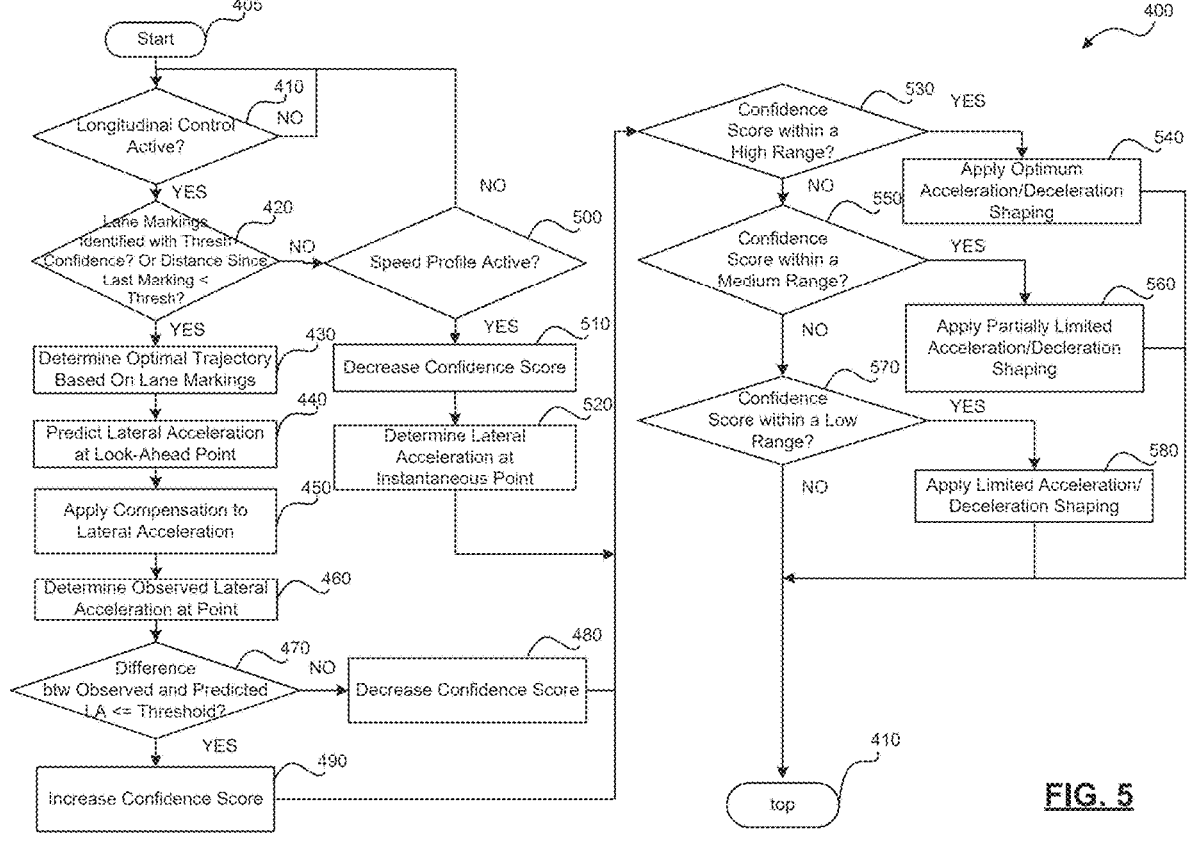
FIG. 5 is a process flow chart depicting an example process for velocity control, in accordance with various embodiments.

Referring now to FIG. 5, and with continued reference to FIGS. 1-4, a flowchart illustrates a process 400 that can be performed by the velocity control system 100 of FIGS. 1-4 in accordance with the present disclosure. As can be appreciated in light of the disclosure, the order of operation within the process 400 is not limited to the sequential execution as illustrated in FIG. 5 but may be performed in one or more varying orders as applicable and in accordance with the present disclosure. In various embodiments, the process 400 can be scheduled to run based on one or more predetermined events, and/or can run continuously during operation of the autonomous vehicle 10, and/or may be run offline prior to operation of the vehicle 10.

In one example, the process 400 may begin at 405. It is determined whether longitudinal control is active at 410, for example, by enablement of an autonomous or semi-autonomous feature. If longitudinal control is not active at 410, the process 400 may continue to monitor for when the longitudinal control is active at 410 or may end. When it is determined that longitudinal control is active at 410, it is determined whether lane markings are identified (e.g., from camera data) with sufficient confidence (e.g., above a threshold) or whether a distance since the last seen lane markings is below a threshold at 420.

When lane markings are identified with a threshold confidence at 420, an optimal trajectory is determined based on the lane markings at 430. A lateral acceleration is predicted at one or more look ahead points along the trajectory at 440. The predicted lateral acceleration is compensated based on any active velocity profile at 450. An observed lateral acceleration is determined at the look ahead points based on the actual vehicle path and/or the steering data at 460.

Thereafter, the difference between the observed and the desired lateral acceleration is computed and compared to a threshold at 470. When the difference is greater than the threshold at 470, the confidence score is decreased at 480. When the difference is less than or equal to the threshold at 470, the confidence score is increased at 490.

At 420, when lane markings are not identified with a threshold confidence or the distance since the lane markings were lost less than a threshold, it is determined whether a velocity profile is active at 500. If a velocity profile is not active at 500, the process 400 continues at 410. If a velocity profile is active at 500, the confidence score is discreated at 510. The lateral acceleration for the instant data point is determined based on the vehicle's current path and optionally compensated based on the active velocity profile at 520. An observed lateral acceleration is determined at the instant data point based on the actual vehicle path and/or the steering data at 460.

Once the confidence score has been determined at 480, 490, or 510, the process 400 proceeds to 530-580, in which the confidence score is compared to three ranges to determine the appropriate velocity profile to enable. Specifically, when the confidence score is high or within a high range as determined in step 530, optimum acceleration is applied, based on the longitudinal velocity being shaped according to the velocity profile that is optimum step 540). Conversely, when it is determined in step 530 that the confidence score is not within the high range, then a determination is made in step 540 as to whether the confidence score is medium or within a medium range. When it is determined in step 540 that the confidence score is medium or within the medium range, then partially limited acceleration is applied, based on the longitudinal velocity being shaped according to the velocity profile that is partially limited (step 560). Conversely, when it is determined in step 540 that the confidence score is not in the medium range, then a determination is made in step 570 as to whether the confidence score is within a low range. When it is determined in step 570 that the confidence score is within the low range, then limited acceleration is applied, based on the longitudinal velocity being shaped according to a velocity profile that is limited. Thereafter, the process 400 may end or return to the beginning at 410.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for providing driving assistance in a vehicle, the vehicle comprising an autonomous vehicle, and the method comprising:

obtaining, via one or more cameras of the vehicle, camera data as to lane markings on a roadway in which the vehicle is travelling;

determining, by a processor of the vehicle, a trajectory of the vehicle along the roadway based on a location of the lane markings and a type of the lane markings;

determining, by the processor, one or more radial points along the trajectory, along with one or more look ahead points along the trajectory ahead of the vehicle based on the one or more radial points:

determining, by the processor, a confidence score based on a predicted lateral acceleration and an actual lateral acceleration at the one or more look ahead points along the trajectory;

determining, by the processor, longitudinal velocity data based on the confidence score; and generating, by the processor, control signals to vehicle actuators to control the vehicle based on the longitudinal velocity data and further based on the confidence score, including by:

automatically providing, via the processor, a first level of acceleration for the vehicle based on the longitudinal velocity being shaped according to a velocity profile that is optimum, when it is determined that the confidence score is within a high range:

automatically providing, via the processor, a second level of acceleration for the vehicle based on the longitudinal velocity being shaped according to the velocity profile being partially limited, when it is determined that the confidence score is within a medium range that is less than the high range; and automatically providing, via the processor, a third level of acceleration for the vehicle based on the longitudinal velocity being shaped according to the velocity profile that is fully limited, when it is determined that the confidence score is within a low range that is less than the medium range.

2. The method of claim 1, wherein when the lane markings are not identified from the camera data, the determining the confidence score comprises decreasing the confidence score.

3. The method of claim 1, wherein the determining the confidence score is based on a difference between the predicted lateral acceleration and the actual lateral acceleration at the one or more look ahead points along the trajectory, wherein when the difference is above a threshold, the confidence score is decreased, and wherein when the difference is below the threshold, the confidence score is increased.

4. The method of claim 1, further comprising determining the actual lateral acceleration based on steering data at the one or more look ahead points.

5. The method of claim 1, wherein the determining the longitudinal velocity data is based on a velocity profile defined by a current velocity, a set velocity, and a desired velocity.

6. The method of claim 1, wherein the radial points, denoted as (r0, r1, and r2), are determined by the processor by sweeping the trajectory based on the following relationship:

$$r = \frac{|y(\ddot{x}_{la})|}{\left[1 + (y(\dot{x}_{la}))^2\right]^{3/2}},$$

12 wherein y $(x)=c_0+c_1x+c_2x^2+c_3x^3$, and wherein la represents look ahead.

7. The method of claim 1, wherein the lateral acceleration is predicted by the processor based on the relationship:

$$a_y = \frac{V_x(t)^2}{r},$$

where r represents the curvature at the one or more look ahead points, and $V_x(t)$ represents the longitudinal velocity at a time t.

8. The method of claim 1, wherein the longitudinal velocity is computed by the processor based on the relationship:

$$V_x(t) = \int_0^{t_{la}} a_x(t)dt + C,$$

wherein ax represents a longitudinal acceleration, and wherein C represents a compensation value determined from a currently applied velocity profile.

9. The method of claim 1, further comprising:

determining, via the processor, if any compensation of the lateral acceleration is needed based on the longitudinal velocity profile being executed.

10. The method of claim 9, further comprising: when the current longitudinal velocity profile requires longitudinal deceleration due to another vehicle being detected in the lane, the predicted lateral acceleration is compensated via the processor to account for the expected deceleration.

11. A system in a vehicle for providing driving assistance, the vehicle comprising an autonomous vehicle, and the system comprising:

one or more cameras of the vehicle that are configured to obtain camera data as to lane markings on a roadway in which the vehicle is travelling; and a processor of the vehicle that is coupled to the one or more cameras and that is configured to:

determine a trajectory of the vehicle along the roadway based on a location of the lane markings and a type of the lane markings;

determine one or more radial points along the trajectory, along with one or more look ahead points along the trajectory ahead of the vehicle based on the one or more radial points;

determine a confidence score based on a predicted lateral acceleration and an actual lateral acceleration at the one or more look ahead points along the trajectory;

determine longitudinal velocity data based on the confidence score; and generate control signals to vehicle actuators to control the vehicle based on the longitudinal velocity data and further based on the confidence score, including by:

automatically providing, via the processor, a first level of acceleration for the vehicle based on the longitudinal velocity being shaped according to a velocity profile that is optimum, when it is determined that the confidence score is within a high range;

automatically providing, via the processor, a second level of acceleration for the vehicle based on the longitudinal velocity being shaped according to the velocity profile being partially limited, when it is determined that the confidence score is within a medium range that is less than the high range; and automatically providing, via the processor, a third level of acceleration for the vehicle based on the longitudinal velocity being shaped according to the velocity profile that is fully limited, when it is determined that the confidence score is within a low range that is less than the medium range.

12. The system of claim 11, wherein when the lane markings are not identified from the camera data, the processor is configured to determine the confidence score by decreasing the confidence score.

13. The system of claim 11, wherein the processor is configured to determine the confidence score based on a difference between the predicted lateral acceleration and the actual lateral acceleration at the one or more look ahead points along the trajectory, wherein when the difference is above a threshold, the processor is configured to decrease the confidence score, and wherein when the difference is below the threshold, the processor is configured to increase the confidence score.

14. The system of claim 11, wherein the processor is further configured to determine the actual lateral acceleration based on steering data at the one or more look ahead points.

15. The system of claim 11, wherein the processor is configured to determine the longitudinal velocity data based on a plurality of velocity profiles, each defined by a current velocity, a set velocity, and a desired velocity, determine the longitudinal velocity data based on a comparison of the confidence score to a plurality of ranges, and select a velocity profile from the plurality of velocity profiles based on the comparison.

16. A vehicle comprising:

a sensor system configured to sense an environment of the vehicle, the sensor system including one or more cameras that are configured to obtain camera data as to lane markings on a roadway in which the vehicle is travelling;

an actuator system; and a controller for implementing a driver assistance system, the controller comprising a processor that is coupled to the one or more cameras and that is configured to:

determine a trajectory of the vehicle along the roadway based on a location of the lane markings and a type of the lane markings;

determine one or more radial points along the trajectory, along with one or more look ahead points along the trajectory ahead of the vehicle based on the one or more radial points;

determine a confidence score based on a predicted lateral acceleration and an actual lateral acceleration at the one or more look ahead points along the trajectory;

determine longitudinal velocity data based on the confidence score; and generate control signals to vehicle actuators to control the vehicle based on the longitudinal velocity data and further based on the confidence score, including by:

automatically providing, via the processor, a first level of acceleration for the vehicle based on the longitudinal velocity being shaped according to a velocity profile that is optimum, when it is determined that the confidence score is within a high range;

automatically providing, via the processor, a second level of acceleration for the vehicle based on the longitudinal velocity being shaped according to the velocity profile being partially limited, when it is determined that the confidence score is within a medium range that is less than the high range; and automatically providing, via the processor, a third level of acceleration for the vehicle based on the longitudinal velocity being shaped according to the velocity profile that is fully limited, when it is determined that the confidence score is within a low range that is less than the medium range.

\* \* \* \* \*